US010420007B2

(12) United States Patent
Poorrezaei et al.

(10) Patent No.: US 10,420,007 B2
(45) Date of Patent: Sep. 17, 2019

(54) ENERGY AWARE ROUTING FOR MESH NETWORKS

(71) Applicant: Silver Spring Networks, Inc., San Jose, CA (US)

(72) Inventors: Kamal Poorrezaei, San Jose, CA (US); Paul Dietrich, Princeton, NJ (US)

(73) Assignee: ITRON NETWORKED SOLUTIONS, INC., Liberty Lake, WA (US)

( * ) Notice: Subject to any disclaimer, the term of this patent is extended or adjusted under 35 U.S.C. 154(b) by 0 days.

(21) Appl. No.: 15/724,205

(22) Filed: Oct. 3, 2017

(65) Prior Publication Data
US 2019/0104460 A1 Apr. 4, 2019

(51) Int. Cl.
| | |
|---|---|
| *H04J 3/16* | (2006.01) |
| *H04W 40/10* | (2009.01) |
| *H04L 12/721* | (2013.01) |
| *H04L 12/26* | (2006.01) |
| *H04W 84/12* | (2009.01) |

(52) U.S. Cl.
CPC ......... *H04W 40/10* (2013.01); *H04L 43/0882* (2013.01); *H04L 45/124* (2013.01); *H04L 45/70* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2005/0163045 A1* | 7/2005 | Randriamasy | H04L 47/10 370/229 |
| 2009/0052327 A1* | 2/2009 | Larsson | H04L 45/00 370/238 |
| 2009/0168653 A1 | 7/2009 | St. Pierre et al. | |
| 2010/0157821 A1* | 6/2010 | Morris | H04L 45/00 370/252 |
| 2010/0329276 A1 | 12/2010 | Wang et al. | |
| 2011/0164527 A1* | 7/2011 | Mishra | H04L 45/123 370/252 |
| 2011/0194472 A1 | 8/2011 | Bahr | |
| 2014/0036683 A1* | 2/2014 | Krishnamurthy | H04W 40/10 370/236 |

(Continued)

OTHER PUBLICATIONS

International Search Report for application No. PCT/US18/54251 dated Jan. 22, 2019.

*Primary Examiner* — Kwang B Yao
*Assistant Examiner* — Juvena W Loo
(74) *Attorney, Agent, or Firm* — Artegis Law Group, LLP

(57) ABSTRACT

A battery-powered node within a wireless mesh network performs energy-aware packet routing based on multiple factors. The battery powered node computes, for a given link to an adjacent node, the energy needed to transmit a packet to the adjacent node. The battery-powered node also determines the amount of battery energy remaining in the adjacent node. Based on these two factors, the battery powered node computes a link cost associated with the link to the adjacent node. The battery-powered node performs a similar computation for all adjacent nodes and then forwards packets via these adjacent nodes based on the associated link costs. The battery-powered node also maintains a table of routes through adjacent nodes, and reroutes packets through different adjacent nodes in response to link failures.

14 Claims, 14 Drawing Sheets

(56) References Cited

U.S. PATENT DOCUMENTS

| | | |
|---|---|---|
| 2015/0281088 A1* | 10/2015 | Wu ...................... H04L 45/125 |
| | | 370/238 |
| 2016/0097796 A1 | 4/2016 | Flammer, III |
| 2016/0212698 A1* | 7/2016 | Guo .................. H04W 52/0203 |
| 2016/0226563 A1 | 8/2016 | Kohli |
| 2017/0171812 A1* | 6/2017 | Guo .................. H04W 52/0212 |
| 2018/0139680 A1* | 5/2018 | Hui ...................... H04W 40/16 |
| 2018/0184360 A1* | 6/2018 | Cavalcanti .......... H04W 40/248 |
| 2018/0198732 A1* | 7/2018 | Karthikeyan ......... H04L 67/322 |

* cited by examiner

|                    | CRUMB ROUTE TABLE 600 |           |
|--------------------|------------------------|-----------|
| <u>602</u>         | <u>604</u>             | <u>606</u> |
| 312(1)             | : [312(1)]             | [0]       |
| 312(2)             | : [312(2)]             | [1]       |
| 312(3)             | : [312(3)]             | [0]       |
| 312(4)             | : [312(4)]             | [3]       |
| 312(5)             | : [312(2)]             | [2]       |
| 312(6)             | : [312(1), 312(2), 312(3), 312(4)] | [2,1,0,3] |

FIG. 6B

ENERGY AWARE ROUTING FOR MESH NETWORKS

BACKGROUND OF THE INVENTION

Field of the Invention

Embodiments of the present invention relate generally to wireless network communications and, more specifically, to robust and energy aware routing for mesh networks.

Description of the Related Art

A conventional wireless mesh network includes a plurality of nodes configured to communicate with one another. In certain types of heterogeneous wireless mesh networks, both continuously-powered nodes (CPDs) and battery-powered nodes (BPDs) communicate and interact with one another within the mesh network. Typically, CPDs are coupled to a power grid and have continuous access to power (except during power outages). BPDs, on the other hand, are battery-powered and therefore have only a finite supply of power. Due to these power constraints, BPDs normally remain in a powered down state and then only power on at specifically timed communication intervals to perform data communications with one another and with CPDs.

When powered on, a conventional node (either a CPD or a BPD) receives packets from neighboring nodes. For each packet, the conventional node determines a destination node to which the packet is addressed and then transmits the packet to the destination node via a particular route across the network. A route generally includes one or more intermediate nodes in the network and the individual communication links associated with those nodes. Although multiple routes may be available through the mesh network to reach any given destination node, conventional nodes typically select the route with highest reliability for transporting packets to the destination node. However, this approach causes certain problems when implemented for BPDs in a wireless mesh network.

In particular, selecting routes based solely on reliability tends to favor routes through centralized nodes with highly reliable links. When these nodes receive an elevated level of network traffic, they consume battery power much faster than the rate at which other less centralized nodes consume battery power. Consequently, these centralized nodes exhaust battery power and power down sooner than less centralized nodes in the mesh network. When a centralized node powers down, network throughput may suffer or the mesh network may become fragmented. In addition, whenever a node exhausts battery power, the node battery has to be replaced, typically requiring a truck roll. However, when multiple node batteries are exhausted at different times, multiple truck rolls are typically needed, which can result in substantial additional overhead.

As the foregoing illustrates, what is needed in the art are more effective approaches for routing packets through wireless mesh networks.

SUMMARY OF THE INVENTION

One embodiment of the present invention sets forth a computer-implemented method for routing packets across a mesh network, including computing a first cost metric based on a first amount of energy associated with a first node and a second amount of energy associated with a second node, computing a second cost metric based on a third amount of energy associated with the first node and a fourth amount of energy associated with a third node, and based on the first cost metric and the second cost metric, selecting the second node for routing a first packet to a first destination along a first route.

At least one advantage of the techniques described herein is that nodes within the mesh network consume battery energy at similar rates, thereby avoiding situations where a single centrally located node depletes all battery energy and powers down prematurely.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 6A-6B illustrate links and associated crumb routes corresponding to a specific node in the wireless mesh network of FIG. 1, according to various embodiments of the present invention;

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

As discussed above, conventional mesh networks tend to route a disproportionate amount of traffic through centralized nodes associated with high reliability routes. Those centralized nodes exhaust battery power faster than other less centralized nodes in the network. When centralized nodes die, network connectivity is significantly reduced.

Further, when nodes die at different times, multiple truck rolls may be required to replace the depleted batteries of those nodes, thereby inefficiently consuming energy and manpower.

To address these issues, embodiments of the invention include a battery-powered node that performs route cost analysis based on route reliability and battery power levels associated with nodes included in different routes. According to this technique, the node transmits packets through the network in a manner that may optimize battery power consumption across the network as a whole. In addition, the node can select between multiple available routes, allowing the node to efficiently reroute packets when a selected route fails, further reducing overall network power consumption.

System Overview

Figure 1:
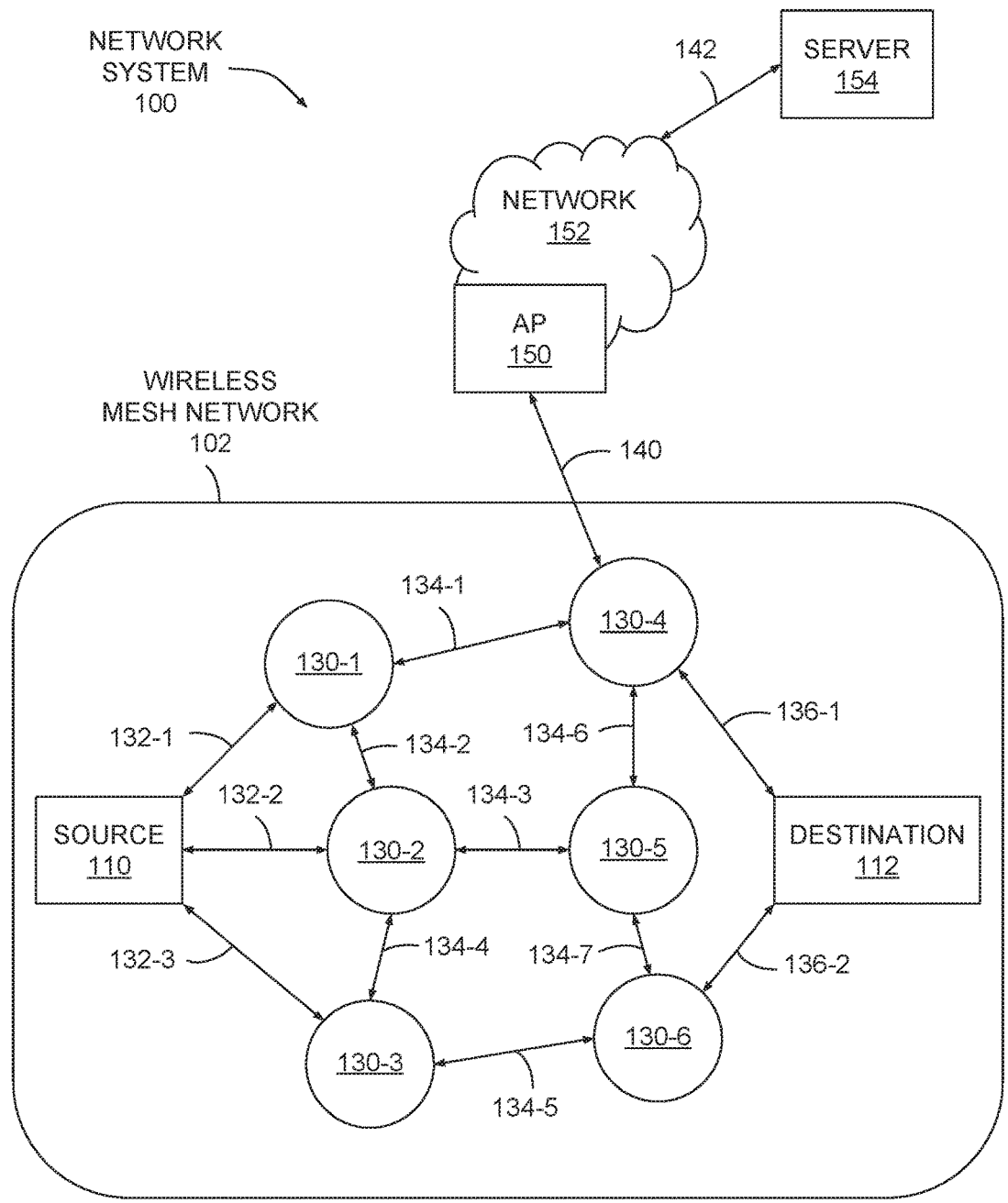
FIG. 1 illustrates a network system configured to implement one or more aspects of the present invention.

FIG. 1 illustrates a network system configured to implement one or more aspects of the present invention. As shown, the network system 100 includes a wireless mesh network 102, which may include a source node 110, intermediate nodes 130 and destination node 112. The source node 110 is able to communicate with certain intermediate nodes 130 via communication links 132. The intermediate nodes 130 communicate among themselves via communication links 134. The intermediate nodes 130 communicate with the destination node 112 via communication links 136. The network system 100 may also include an access point 150, a network 152, and a server 154.

A discovery protocol may be implemented to determine node adjacency to one or more adjacent nodes. For example, intermediate node 130-2 may execute the discovery protocol to determine that nodes 110, 130-1, 130-3, and 130-5 are adjacent to node 130-2. Furthermore, this node adjacency indicates that communication links 132-2, 134-2, 134-4 and 134-3 may be established between the nodes 110, 130-1, 130-3, and 130-5, respectively. As also described in greater detail below in conjunction with FIGS. 6A-9B, when implementing the discovery protocol a given node may establish a "crumb route" table. The crumb route table indicates particular adjacent nodes through which traffic can be routed to reach any other node in the network. Any technically feasible discovery protocol may be implemented without departing from the scope and spirit of embodiments of the present invention.

The discovery protocol may also be implemented to determine the hopping sequences of adjacent nodes, i.e. the sequence of channels across which nodes periodically receive payload data. As is known in the art, a "channel" may correspond to a particular range of frequencies. Once adjacency is established between the source node 110 and at least one intermediate node 130, the source node 110 may generate payload data for delivery to the destination node 112, assuming a path is available. The payload data may comprise an Internet protocol (IP) packet, or any other technically feasible unit of data. Similarly, any technically feasible addressing and forwarding techniques may be implemented to facilitate delivery of the payload data from the source node 110 to the destination node 112. For example, the payload data may include a header field configured to include a destination address, such as an IP address or media access control (MAC) address.

Each intermediate node 130 may be configured to forward the payload data based on the destination address. Alternatively, the payload data may include a header field configured to include at least one switch label to define a predetermined path from the source node 110 to the destination node 112. A forwarding database may be maintained by each intermediate node 130 that indicates which communication link 132, 134, 136 should be used and in what priority to transmit the payload data for delivery to the destination node 112. The forwarding database may represent multiple routes to the destination address, and each of the multiple routes may include one or more cost values. Any technically feasible type of cost value may characterize a link or a route within the network system 100, although one specific approach is discussed in greater detail below in conjunction with FIGS. 3A-5. In one embodiment, each node within the wireless mesh network 102 implements similar functionality and each node may act as a source node, destination node or intermediate node.

In network system 100, the access point 150 is configured to communicate with at least one node within the wireless mesh network 102, such as intermediate node 130-4. Communication may include transmission of payload data, timing data, or any other technically relevant data between the access point 150 and the at least one node within the wireless mesh network 102. For example, communications link 140 may be established between the access point 150 and intermediate node 130-4 to facilitate transmission of payload data between wireless mesh network 102 and network 152. The network 152 is coupled to the server 154 via communications link 142. The access point 150 is coupled to the network 152, which may comprise any wired, optical, wireless, or hybrid network configured to transmit payload data between the access point 150 and the server 154.

In one embodiment, the server 154 represents a destination for payload data originating within the wireless mesh network 102 and a source of payload data destined for one or more nodes within the wireless mesh network 102. In one embodiment, the server 154 is a computing device, including a processor and memory, and executes an application for interacting with nodes within the wireless mesh network 102. For example, nodes within the wireless mesh network 102 may perform measurements to generate measurement data, such as power consumption data. The server 154 may execute an application to collect the measurement data and report the measurement data. In one embodiment, the server 154 queries nodes within the wireless mesh network 102 for certain data. Each queried node replies with requested data, such as consumption data, system status and health data, and so forth. In an alternative embodiment, each node within the wireless mesh network 102 autonomously reports certain data, which is collected by the server 154 as the data becomes available via autonomous reporting.

The techniques described herein are sufficiently flexible to be utilized within any technically feasible network environment including, without limitation, a wide-area network (WAN) or a local-area network (LAN). Moreover, multiple network types may exist within a given network system 100. For example, communications between two nodes 130 or between a node 130 and the corresponding access point 150 may be via a radio-frequency local-area network (RF LAN), while communications between access points 150 and the network may be via a WAN such as a general packet radio service (GPRS). As mentioned above, each node within wireless mesh network 102 includes a network interface that enables the node to communicate wirelessly with other nodes. Each node 130 may implement any and all embodiments of the invention by operation of the network interface. An exemplary network interface is described below in conjunction with FIG. 2.

Figure 2:
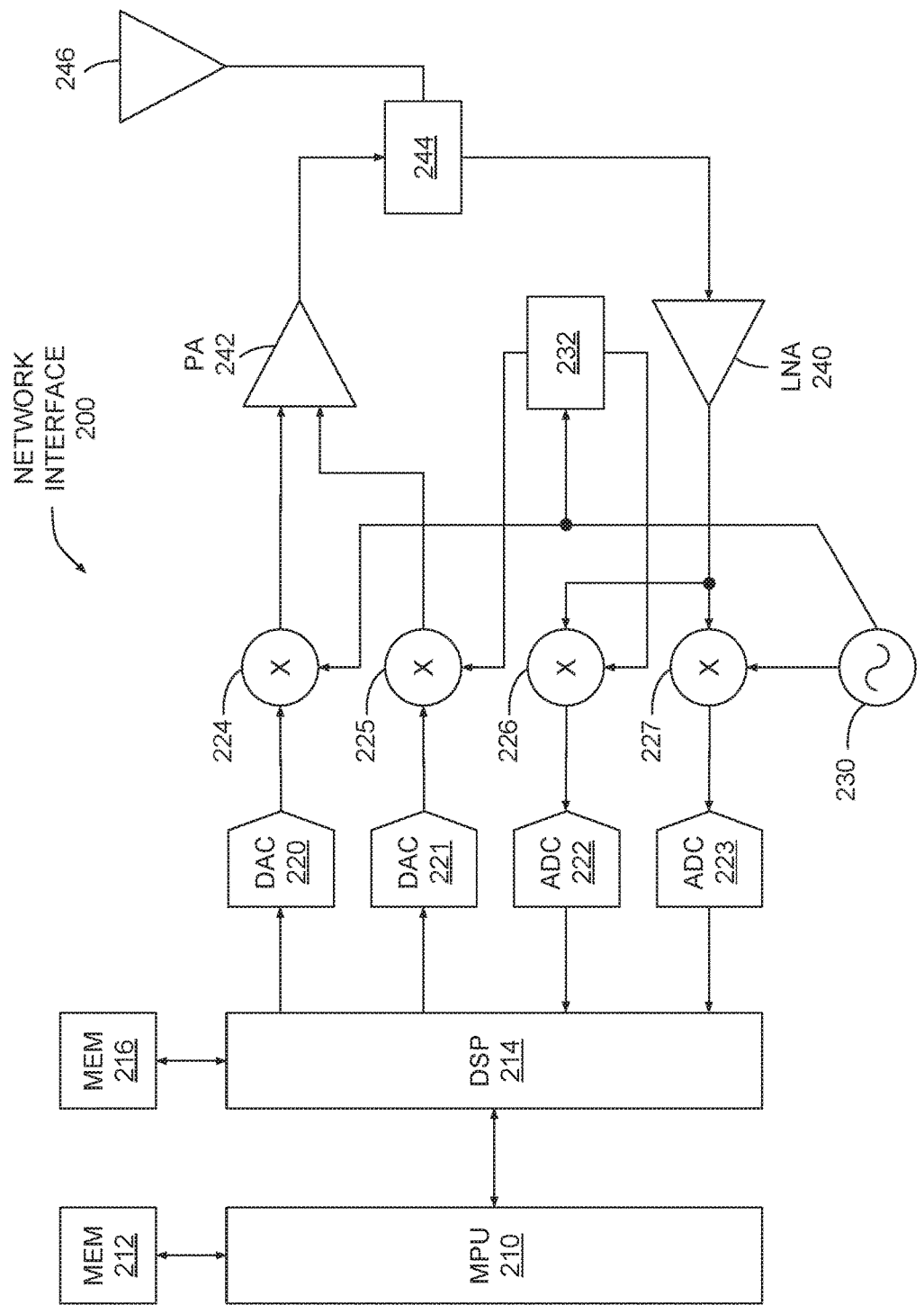
FIG. 2 illustrates a network interface configured to transmit and receive data within the mesh network of FIG. 1, according to various embodiments of the present invention.

FIG. 2 illustrates a network interface configured to transmit and receive data within the mesh network of FIG. 1, according to various embodiments of the present invention. Each node 110, 112, 130 within the wireless mesh network 102 of FIG. 1 includes at least one instance of the network interface 200. The network interface 200 may include, without limitation, a microprocessor unit (MPU) 210, a digital signal processor (DSP) 214, digital to analog converters (DACs) 220, 221, analog to digital converters (ADCs) 222, 223, analog mixers 224, 225, 226, 227, a phase shifter 232, an oscillator 230, a power amplifier (PA) 242, a low noise amplifier (LNA) 240, an antenna switch 244, and an antenna 246. Oscillator 230 may be coupled to a clock circuit (not shown) configured to maintain an estimate of the current time. MPU 210 may be configured to update this time estimate, and other data associated with that time estimate.

A memory 212 may be coupled to the MPU 210 for local program and data storage. Similarly, a memory 216 may be coupled to the DSP 214 for local program and data storage. Memory 212 and/or memory 216 may be used to buffer incoming data as well as store data structures such as, e.g., a forwarding database, and/or routing tables that include primary and secondary path information, path cost values, and so forth.

In one embodiment, the MPU 210 implements procedures for processing IP packets transmitted or received as payload data by the network interface 200. The procedures for processing the IP packets may include, without limitation, wireless routing, encryption, authentication, protocol translation, and routing between and among different wireless and wired network ports. In one embodiment, MPU 210 implements the techniques performed by the node when MPU 210 executes a firmware program stored in memory within network interface 200.

The MPU 214 is coupled to DAC 220 and DAC 221. Each DAC 220, 221 is configured to convert a stream of outbound digital values into a corresponding analog signal. The outbound digital values are computed by the signal processing procedures for modulating one or more channels. The DSP 214 is also coupled to ADC 222 and ADC 223. Each ADC 222, 223 is configured to sample and quantize an analog signal to generate a stream of inbound digital values. The inbound digital values are processed by the signal processing procedures to demodulate and extract payload data from the inbound digital values.

In one embodiment, MPU 210 and/or DSP 214 are configured to buffer incoming data within memory 212 and/or memory 216. The incoming data may be buffered in any technically feasible format, including, for example, raw soft bits from individual channels, demodulated bits, raw ADC samples, and so forth. MPU 210 and/or DSP 214 may buffer within memory 212 and/or memory 216 any portion of data received across the set of channels from which antenna 246 receives data, including all such data. MPU 210 and/or DSP 214 may then perform various operations with the buffered data, including demodulation operations, decoding operations, and so forth.

Persons having ordinary skill in the art will recognize that network interface 200 represents just one possible network interface that may be implemented within wireless mesh network 102 shown in FIG. 1, and that any other technically feasible device for transmitting and receiving data may be incorporated within any of the nodes within wireless mesh network 102.

Referring generally to FIGS. 1-2, each node 130 is configured to perform energy aware route cost analysis to load-balance battery power consumption and reroute packets in response to route failures, as described in greater detail below in conjunction with FIGS. 3A-9.

Energy Aware Route Cost Analysis

Figure 3A:
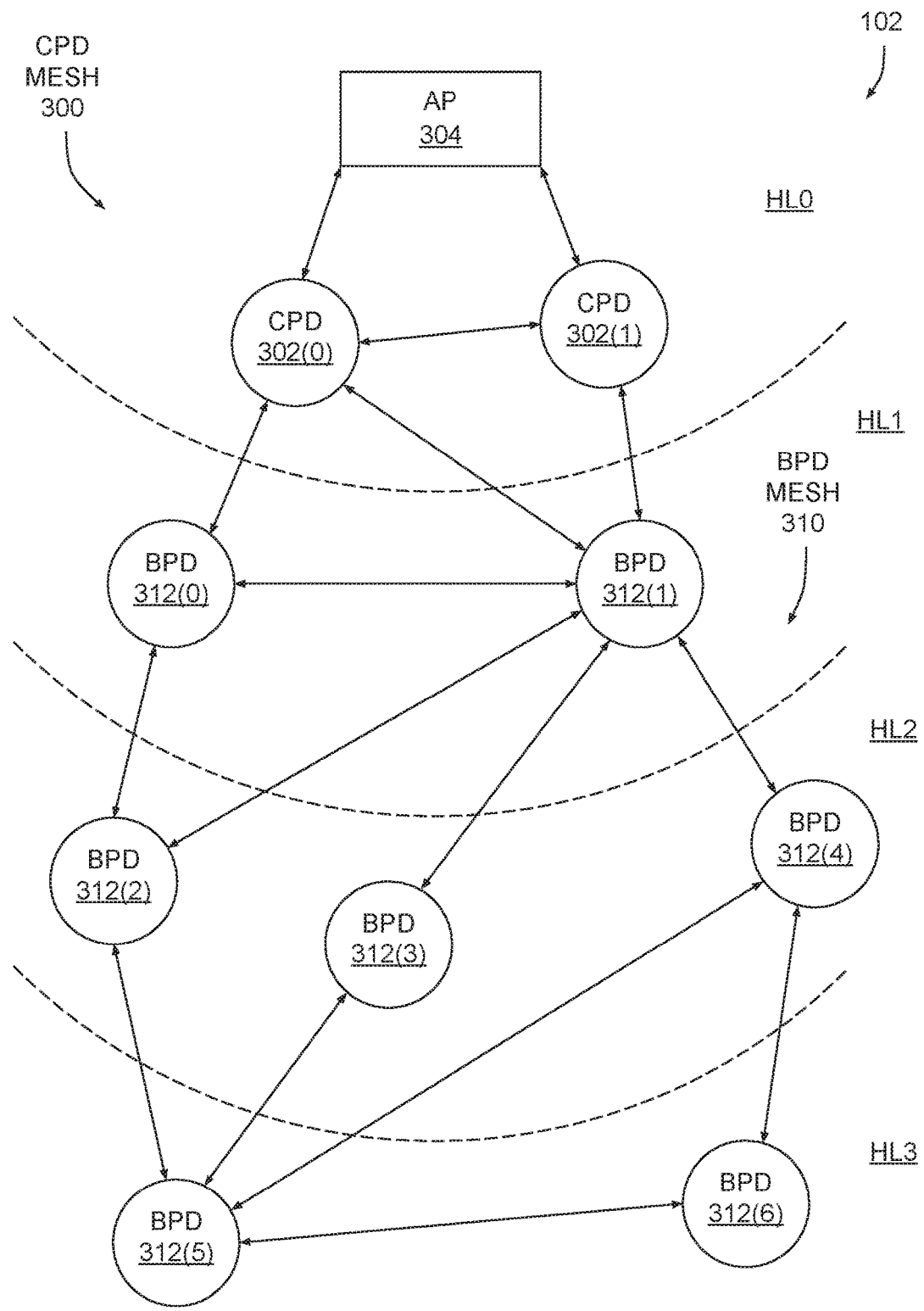
FIGS. 3A-3B illustrate multiple routes through the wireless mesh network of FIG. 1, according to various embodiments of the present invention.
Figure 3B:
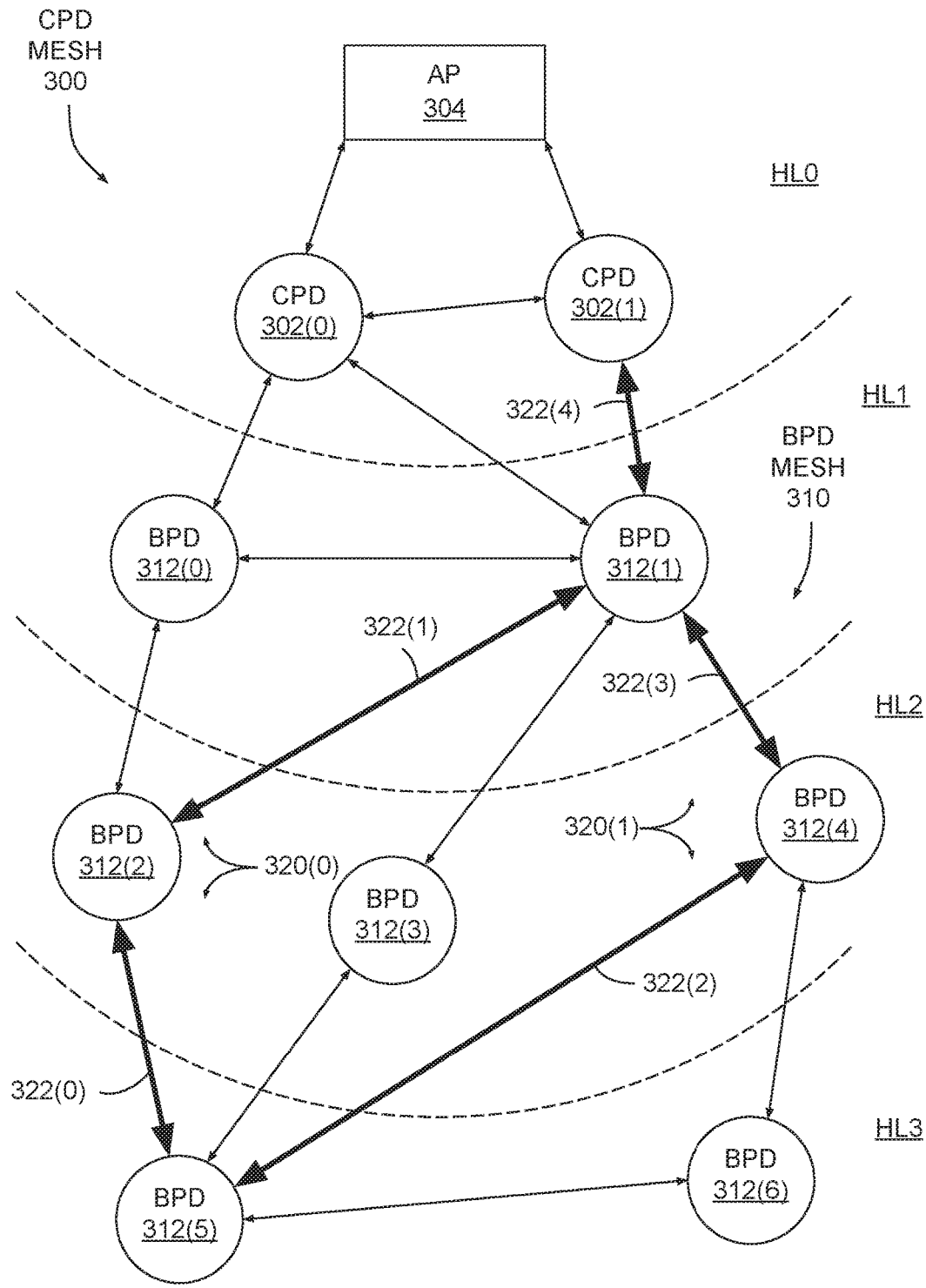

FIGS. 3A-3B illustrate multiple routes through the wireless mesh network of FIG. 1, according to various embodiments of the present invention.

As shown in FIG. 3A, wireless mesh network 102 of FIG. 1 is divided into a continuously-powered device (CPD) mesh 300 and a battery-powered device (BPD) mesh 310. CPD mesh 300 includes CPDs 302(0) and 302(1) as well as an access point (AP) 304. CPDs 302 may include one or more nodes 130 and/or APs 150 of FIG. 1. BPD mesh 310 includes BPDs 312(0) through 312(6). BPDs 312 may include one or more nodes 130 of FIG. 1. As a general matter, data that is transmitted from CPD mesh 300 to BPD mesh 310 is referred to herein as "outbound" data and may be described as traveling in an "outbound," "downlink," or "downstream" direction. Similarly, data that is transmitted from BPD mesh 310 towards CPD mesh 300 is referred to herein as "inbound" data and may be described as traveling in an "inbound," "uplink," or "upstream" direction.

BPDs 312 of BPD mesh 310 are included in different "hop layers" based on hopping distance to CPD mesh 300. BPDs 312(0) and 312(1) are included in hop layer one (HL1) because those nodes are one hop away from CPD mesh 300. BPDs 312(2), 312(3), and 312(4) are included in hop layer two (HL2) because those nodes are two hops away from CPD mesh 300. BPDs 312(5) and 312(6) are included in hop layer three (HL3) because those nodes are three hops away from CPD mesh 300. Wireless mesh network 102 is configured to propagate data packets across CPD mesh 300 and BPD mesh 310 in a coordinated manner based on hop layer. Those data packets may include time beacons, calibration packets, network packets, and so forth.

Because BPDs 312 operate with a limited power supply, a given BPD 312 may power down for long periods of time and then power on briefly to perform data communications with other BPDs 312. When powered on, BPDs 312 may receive packets from adjacent CPDs 302 or BPDs 312 that target specific destination. For each such packet, the BPD 312 then selects between multiple available routes by performing a particular route cost analysis that is described by way of example below in conjunction with FIG. 3B.

As shown in FIG. 3B, BPD 312(5) considers multiple available routes 320 across which BPD 312(5) may transmit packets to reach CPD 302(1). In particular, route 320(0) includes links 322(0), 322(1), and 322(4) and involves hops across BPDs 312(2) and 312(1). Route 320(1) includes links 322(2) and 322(3) and involves hops across BPDs 312(4) and 312(1). BPD 312(5) is configured to select between routes 320(0) and 320(1) by computing a cost value for each of those routes. BPD 312(5) computes the cost value for a particular route 320 by summing the individual link costs associated with each link 322 included in the route.

For example, BPD 312(5) could determine the route cost of route 320(0) by summing the individual link costs associated with links 322(0), 322(1) and 322(4). Similarly, BPD 312(5) could determine the route cost of route 320(1) by summing the individual link costs associated with links 322(2), 322(3), and 322(4). BPDs 312 may obtain link cost information from other BPDs 312 during the discovery process discussed above and/or on a periodic basis.

For the sake of generality, consider two BPDs 312(A) and 312(B), where A and B are integer values. For example, BPD 312(A) could be BPD 312(5) and BPD 312(B) could be BPD 312(2). BPD 312(A) may compute the link cost between BPD 312(A) and BPD 312(B) by evaluating Equation 1:

$$LC_{AB} = \widetilde{RC}_{AB} + NC_{AB} \qquad \text{Equation 1}$$

In Equation 1, the link cost $LC_{AB}$ between BPDs 312(A) and 312(B) is equal to the sum of the radio cost $\widetilde{RC}_{AB}$ and the node cost $NC_{AB}$. The radio cost $\widetilde{RC}_{AB}$ is a measure of the average amount of battery energy BPD 312(A) needs to send a packet successfully to BPD 312(B). $\widetilde{RC}_{AB}$ is defined by Equation 2:

$$\widetilde{RC}_{AB} = \frac{(N_S + N_R) \times E_{TX}}{N_S} \qquad \text{Equation 2}$$

In Equation 2, $N_S$ is a number of packets sent from BPD 312(A) to 312(B), and $N_R$ is the number of packet retries needed to successfully send those $N_S$ packets. Packet retries may be needed when a packet transmission fails or is otherwise not acknowledged by the target recipient. $E_{TX}$ (is the amount of energy needed to send a packet. Referring back now to Equation 1, the node cost $NC_{AB}$ is given by Equation 3:

$$NC_{AB} = \widetilde{RC}_{AB} \times \alpha_E \times f(E_{BAT}/E_{TOT}) \qquad \text{Equation 3}$$

In Equation 3, $E_{BAT}$ is the battery power level of BPD 312(B) and $E_{TOT}$ is the maximum battery level of BPD 312(B). Hence, $E_{BAT}/E_{TOT}$ is the percentage of battery power remaining in a battery associated with BPD 312(B). Additionally, $f(E_{BAT}/E_{TOT})$ is a normalization function that is evaluated based on the percentage $E_{BAT}$ Different options for this normalization function are discussed in greater detail below in conjunction with FIGS. 4A-4B. Finally, $\alpha_E$ is a parameter that defines the percentage contribution $f(E_{BAT}/E_{TOT})$ to the overall node cost $NC_{AB}$.

Figure 4A:
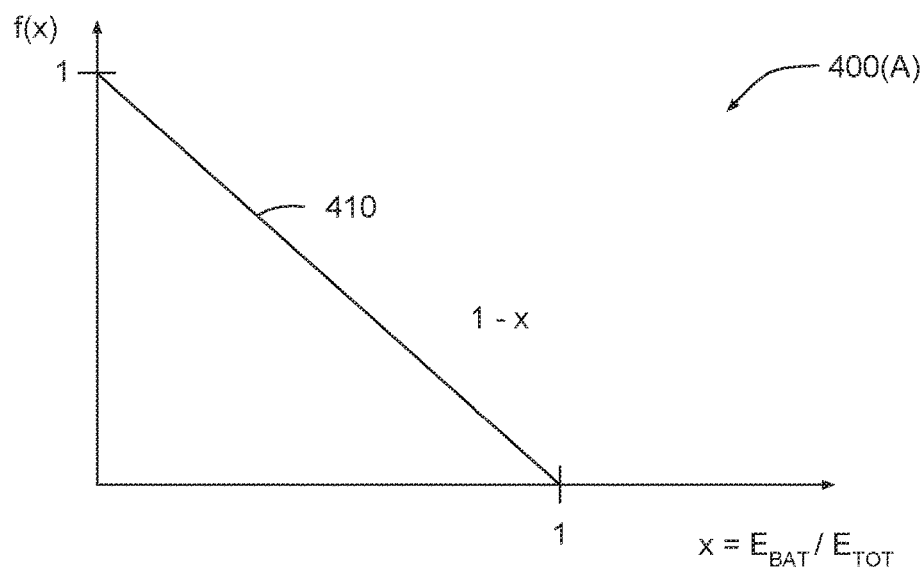
FIGS. 4A-4B illustrate exemplary normalization functions according to which routes across the wireless mesh network of FIG. 1 can be selected, according to various embodiments of the present invention.
Figure 4B:
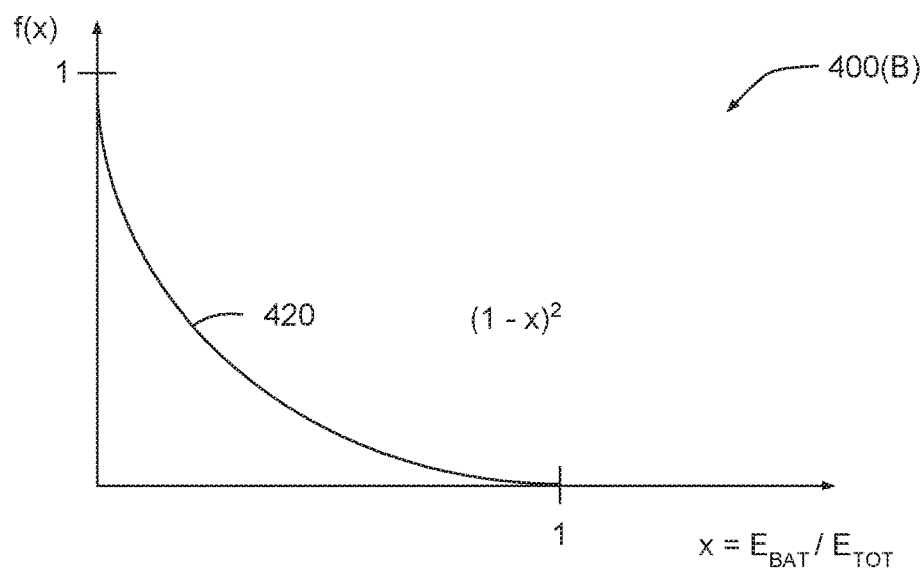

FIGS. 4A-4B illustrate exemplary normalization functions according to which routes across the wireless mesh network of FIG. 1 can be selected, according to various embodiments of the present invention. As shown in FIG. 4A, a graph 400(A) includes a plot 410. Plot 410 reflects the function 1-x evaluated over x in the range 0 to 1, where $x = E_{BAT}/E_{TOT}$. This function is shown below as Equation 4:

$$f(x) = 1 - x \qquad \text{Equation 4}$$

BPDs 312 may evaluate Equation 3 discussed above based on the normalization function defined in Equation 4, in some embodiments. FIG. 4B illustrates an alternative normalization function.

As shown in FIG. 4B, a graph 400(B) includes a plot 420. Plot 420 reflects the function $(1-x)^2$ evaluated over x in the range 0 to 1, where $x = E_{BAT}/E_{TOT}$. This function is shown below as Equation 5:

$$f(x) = (1-x)^2 \qquad \text{Equation 5}$$

BPDs 312 may evaluate Equation 3 discussed above based on the normalization function defined in Equation 5, in other embodiments.

Referring generally to FIGS. 4A-4B, BPDs 312 may implement either normalization function when evaluating Equation 3, although the normalization function defined in Equation 5 places a larger proportional cost on links through BPDs 312 with very low residual battery power. Accordingly, routes through these low battery BPDs may be avoided due to the associated high cost, thereby extending the lifetime of those low battery BPDs.

Referring generally to Equations 1-5, although these equations include specific expressions defining the link cost between any two BPDs 312(A) and 312(B), persons skilled in the art will understand that other forms of these equations also fall within the scope of the present invention. As a general matter, the present disclosure defines a link cost metric that is based on both (i) energy needed to send a packet to a target node, and (ii) remaining battery energy of the target node.

Referring back now to FIG. 3B, BPD 312(5) executes various software algorithms to evaluate Equations 1-3 and one of Equations 4 and 5, thereby determining the link cost associated with each of links 322(0) and 322(2). Each of the other BPDs 312 shown in FIG. 3B performs a similar procedure. Accordingly, each BPD 312 may store a different link cost for each link 322 to a neighboring BPD 312 or CPD 302. In some situations, link costs are symmetrical, so any link cost $LC_{AB}$ is equal to the reciprocal link cost $LC_{BA}$. However, in practice, link costs are typically asymmetrical and, thus, $LC_{AB}$ is usually unequal to $LC_{BA}$.

In one embodiment, BPD 312(5) accumulates link costs across all links 322 within each route 320 to compute an overall route cost for each such route. BPD 312(5) may then select a route 320 with minimal route cost compared to other routes, and forward traffic along the selected route.

In another embodiment, BPD 312 may determine that some or all available routes 320 fall within a particular range of one another, and then perform further computations to distribute traffic between those different routes. For example, BPD 312(5) could determine that both routes 320(0) and 320(1) have route costs that fall beneath a maximum allowable route cost, and then distribute traffic between those two routes in proportion to the associated link costs. This approach may mitigate issues related to uncertainty in radio cost computations and also allow BPDs 312 to adjust traffic flow when routes fail.

Consider now a generic BPD 312(A) with established routes through BPDs 312(B) and 312(C). BPDs 312(A), 312(B), and 312(C) could be, for example, BPDs 312(5), 312(2), and 312(4), respectively. To implement the above traffic distribution technique, BPD 312(A) evaluates Equation 6 to determine the number of packets per day to route through BPD 312(B):

$$F_{AB} = G \times \frac{LC_{AC}}{LC_{AB} + LC_{AC}} \qquad \text{Equation 6}$$

BPD 312(A) also evaluates Equation 7 to determine the number of packets per day to route through BPD 312(C):

$$F_{AC} = G \times \frac{LC_{AB}}{LC_{AB} + LC_{AC}} \qquad \text{Equation 7}$$

In Equations 6 and 7, G represents the total number of packets received by BPD 312(A) over a time period, $LC_{AB}$ is the link cost between BPDs 312(A) and 312(B), and $LC_{Ac}$ is the link cost between BPDs 312(A) and 312(C). According to these equations, the number of packets routed through BPD 312(B) increases or decreases when the link cost associated with BPD 312(C) increases or decreases, respectively. Similarly, the number of packets routed through BPD 312(C) increases or decreases when the link cost associated with BPD 312(B) increases or decreases, respectively. Although Equations 6 and 7 define packet distributions between just two potential routes, persons skilled in the art will understand how this approach can be generalized to any number of routes.

Figure 5:
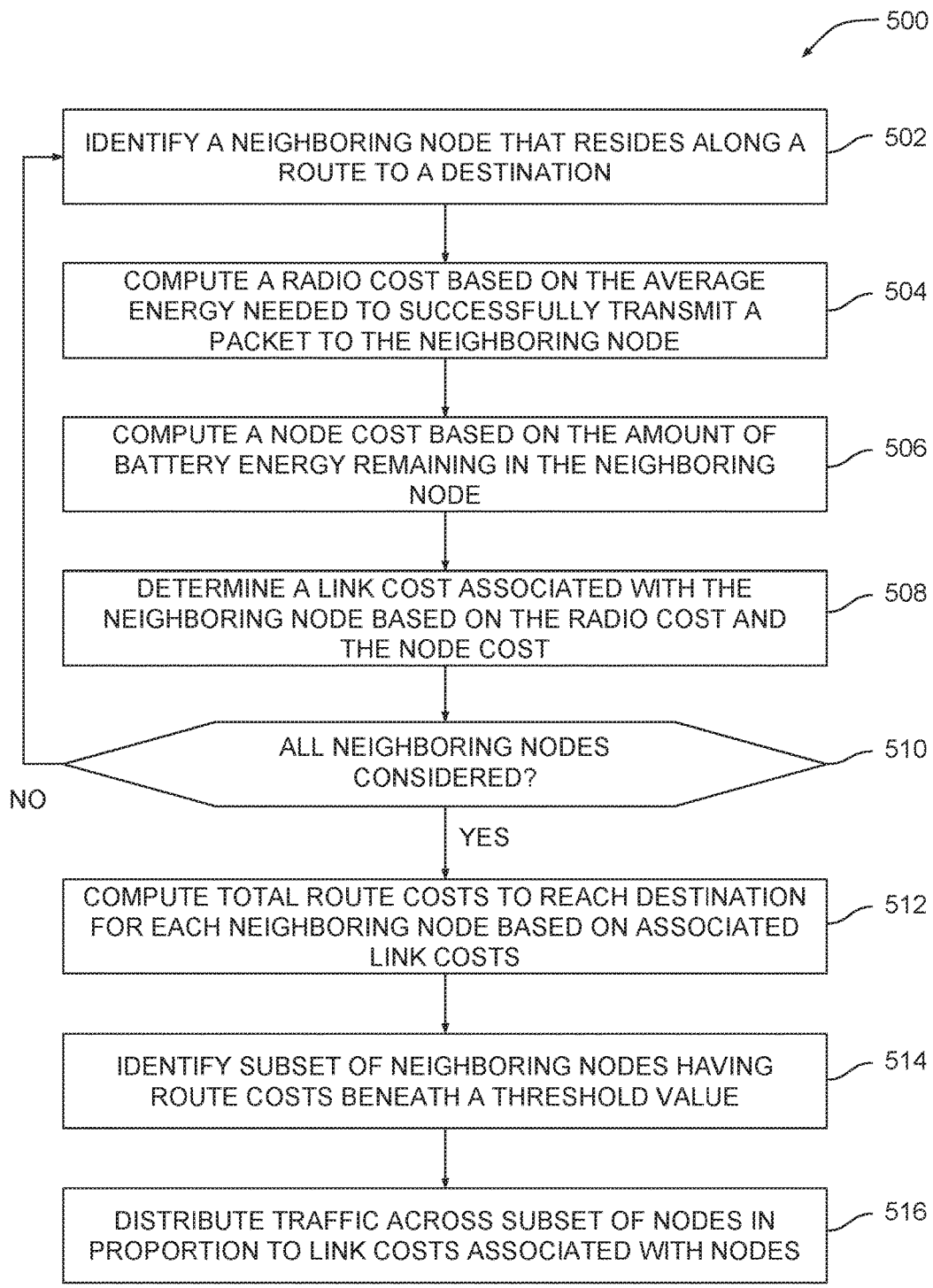
FIG. 5 is a flow diagram of method steps for selecting a route across a wireless mesh network, according to various embodiments of the present invention.

FIG. 5 is a flow diagram of method steps for selecting a route across a wireless mesh network, according to various embodiments of the present invention. Although the method steps are described in conjunction with the systems of FIGS. 1-4, persons skilled in the art will understand that any system configured to perform the method steps, in any order, is within the scope of the present invention.

As shown, a method 500 begins at step 502, where a BPD 312 identifies a neighboring node that resides along a route to a destination node, such as a CPD 302. The neighboring node could be another BPD 312 residing in an adjacent hop layer, for example. At step 504, the BPD 312 computes a radio cost based on the average energy needed to successfully transmit a packet to the neighboring node. The BPD 312 may evaluate Equation 2 when performing step 504. At step 506, the BPD 312 computes a node cost based on the amount of battery energy remaining in the neighboring node. The BPD 312 may evaluate Equation 3 and either Equation 4 or 5 when performing step 506. At step 508, the BPD 312 determines a link cost associated with the neighboring node based on the radio cost and the node cost. The BPD 312 may evaluate Equation 1 when performing step 508.

At step 510, the BPD 312 determines whether all neighboring nodes have been considered via steps 502, 504, 506, and 508. If the BPD 312 has not generated a link cost for links to all neighboring nodes, then the method returns to step 502 and repeats steps 502, 504, 506, and 508. Otherwise, the method 500 proceeds to step 512. At step 512, the BPD 312 computes total route costs to reach the CPD 302 for each neighboring node considered via steps 502, 504, 506, and 508 based on the associated link costs.

At step 514, the BPD 312 identifies a subset of neighboring nodes having route costs beneath a threshold value. In one embodiment, the BPD 312 identifies all neighboring nodes having route costs within a specific range of one another. At step 516, the BPD 312 distributes traffic across the subset of nodes identified at step in proportion to the link costs associated with those nodes.

The techniques described above may be performed separately or in conjunction with one another to transmit packets across wireless mesh network 102 in an energy-sensitive manner and across multiple routes. BPDs 312 may also distribute traffic across alternative routes in response to route failures, as described in greater detail below in conjunction with FIGS. 6A-9.

Packet Rerouting in Response to Route Failure

Figure 6A:
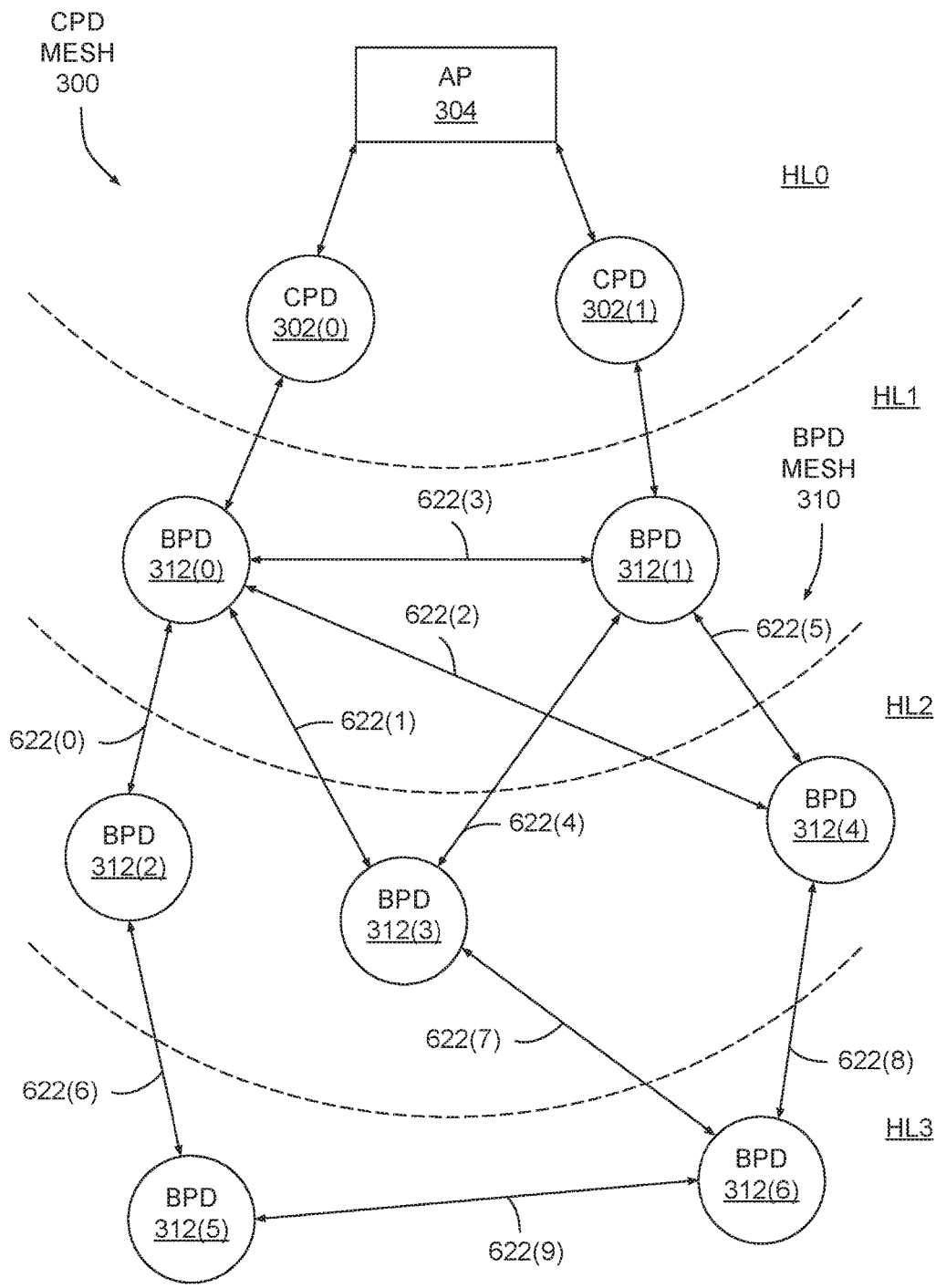

FIGS. 6A-6B illustrate links and associated crumb routes corresponding to a specific node in the wireless mesh network of FIG. 1, according to various embodiments of the present invention. As shown in FIG. 6A, BPD 312(0) is coupled to BPDs 312(2), 312(3), 312(4), and 312(1) via links 622(0), 622(1), 622(2), and 622(3), respectively. BPD 312(1) is coupled to BPDs 312(3) and 312(4) via links 622(4) and 622(5), respectively. BPD 312(2) is coupled to BPD 312(5) via link 622(6). BPD 312(3) is coupled to BPD 312(6) via link 622(7). BPD 312(4) is coupled to BPD 312(6) via link 622(8).

BPD 312(0) is configured to store a data structure referred to as a "crumb route table" according to which BPD 312(0) may route packets across wireless mesh network 102. The crumb route table defines, for any destination node to which BPD 312(0) may transmit a packet, the particular set of adjacent nodes capable of forwarding packets towards the destination node. An exemplary crumb route table is shown in FIG. 6B.

As shown in FIG. 6B, crumb route table 600 includes a destination column 602, an adjacency column 604, and failure counters 606. Destination column 602 specifies destination nodes to which BPD 312(0) may transmit packets. Destination column 602 indicates that BPD 312(0) may transmit packets to any of BPDs 312(1) through 312(6). Adjacency column 604 specifies, for each node included in destination column 602, one or more adjacent nodes to which BPD 312 can transmit packets to reach the corresponding destination node. Each row of failure counters 606 tracks, for any adjacent nodes included in the corresponding row of adjacency column 604, the number of failed packet transmissions attributed to those adjacent nodes.

When a given destination node included in adjacency column 604 is adjacent to BPD 312(0), adjacency column 604 includes the destination node itself. For example, as shown in FIG. 6A, BPDs 312(1) through 312(4) are adjacent to BPD 312(0), and so adjacency column 604 indicates that BPD 312(0) may transmit packets that target these BPDs simply by transmitting packets directly thereto.

When a given destination node is not adjacent to BPD 312(0), adjacency column 604 indicates the particular set of adjacent nodes capable of routing packets towards that destination node. For example, as shown in FIG. 6A, BPD 312(5) is not adjacent to BPD 312(0) but is downstream of BPD 312(2). Accordingly, adjacency column 604 indicates that BPD 312(0) may transmit packets to BPD 312(5) by transmitting those packets via BPD 312(2). BPD 312(2) would receive the packets and then forward those packets onwards to BPD 312(5). Similarly, BPD 312(6) is not adjacent to BPD 312(0) but is downstream of BPDs 312(1) through 312(4). Adjacency column 604 thus indicates that BPD 312(0) may transmit packets to BPD 312(6) by transmitting those packets via any of BPDs 312(1) through 312(4).

BPD 312(0) is configured to update failure counters 606 in response to determining that packets routed through specific adjacent nodes failed reach the destination node. When any failure counter 606 reaches a threshold value, BPD 312(0) may remove the corresponding adjacent node from adjacency column 604 and/or mark routes through that node as inactive. BPD 312(0) may monitor inactive routes and restore the associated adjacent nodes to adjacency column 604 when those routes become active again. BPD 312 may monitor inactive routes by transmitting low volume traffic across those routes and listening for acknowledgement packets.

Referring generally to FIGS. 6A-6B, each BPD 312 may include a separate crumb route table indicating the particular adjacent nodes capable of routing packets to specific destination nodes in wireless mesh network 102. BPDs 312 may establish these tables during the discovery process mentioned above in conjunction with FIG. 1. BPDs 312 may rely on these tables to reroute packets when links become unavailable, as described in greater detail below in conjunction with FIGS. 7A-7B.

Figure 7A:
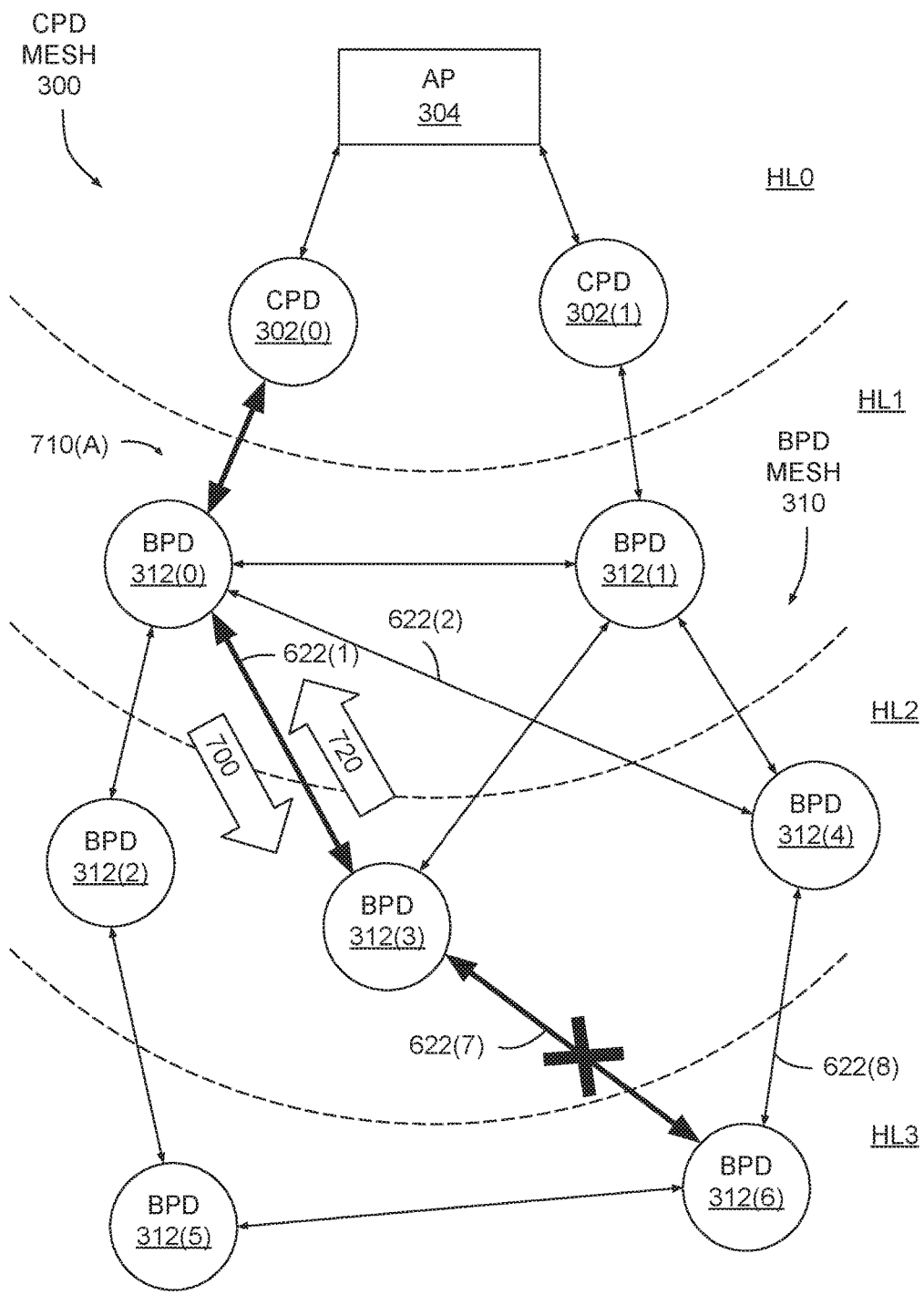
FIGS. 7A-7B illustrates how a packet is rerouted based on the crumb routes of FIG. 6B, according to various embodiments of the present invention.
Figure 7B:
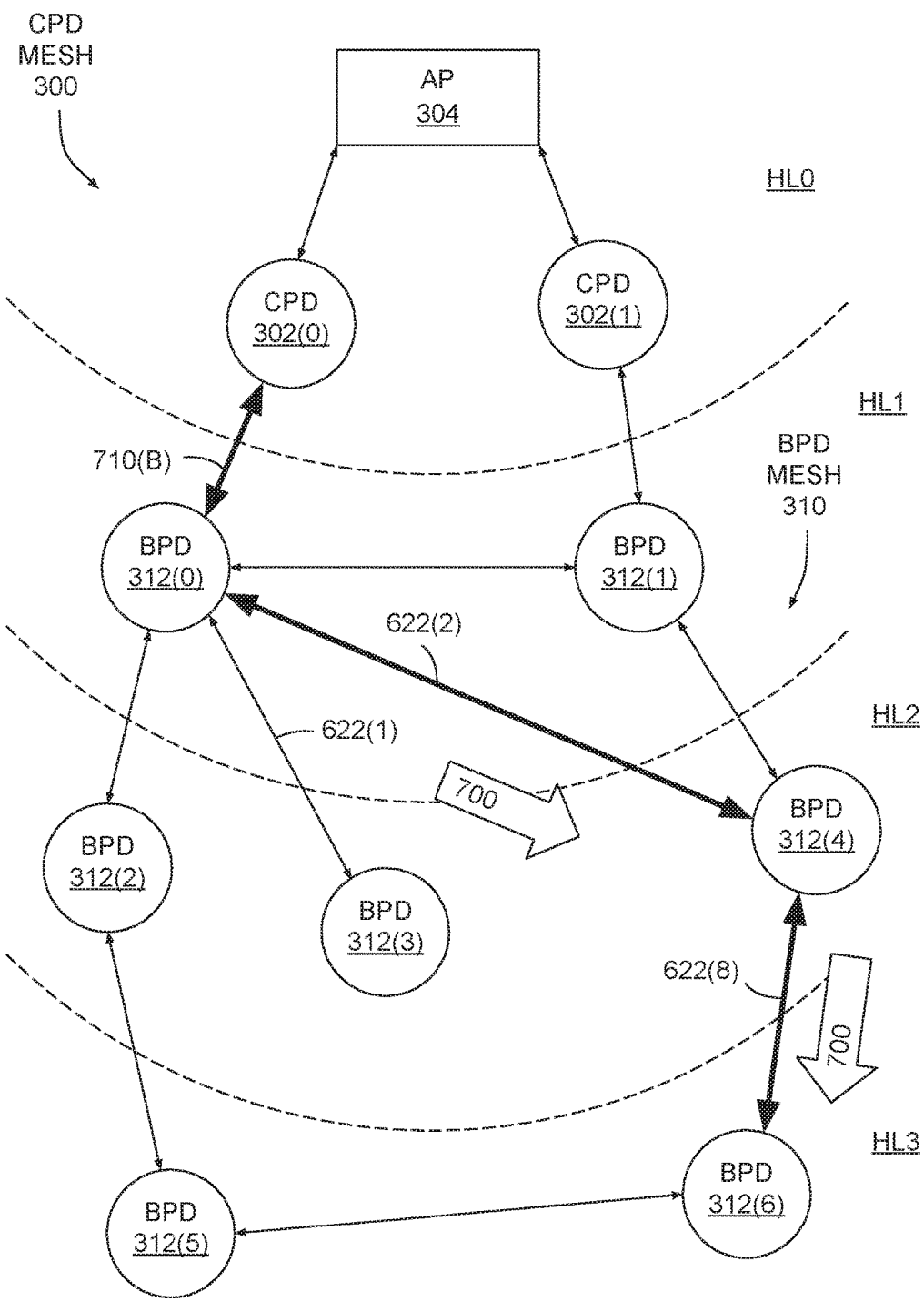

FIGS. 7A-7B illustrates how a packet is rerouted based on the crumb routes of FIG. 6B, according to various embodiments of the present invention. As shown in FIG. 7A, BPD 312(0) transmits a packet 700 along a route 710(A) that includes links 622(1) and 622(7). CPD 302(0) is the origin of packet 700, and BPD 312(6) is the destination for packet 700. However, link 622(7) is inactive and so BPD 312(3) cannot directly communicate with BPD 312(6).

Link 622(7) could become inactive due to radio interference between BPDs 312(3) and 312(6) or timing and/or synchronization issues. Link failures in general may occur due to acute communications problems between nodes or due to complete node failures, among other possibilities. BPD 312(3) may determine that link 622(7) is inactive upon forwarding packet 700 to BPD 312(6) without subsequently receiving any acknowledgement packets from BPD 312(6). In one embodiment, BPD 312(3) may record the number of failed forwarding attempts in a failure counter within the associated crumb route table, and mark link 622(7) as inactive when that number exceeds a threshold value. BPD 312(3) may also mark link 622(7) as active when and if that link recovers. Once BPD 312(3) determines that packet 700 cannot be forwarded to BPD 312(6) via link 622(7), BPD 312(3) transmits a failure notification 720 upstream to BPD 312(0). BPD 312(0) then identifies an alternate route to BPD 312(6), as discussed below in conjunction with FIG. 7B.

As shown in FIG. 7B, BPD 312(0) transmits packet 700 to BPD 312(6) along route 710(B) that includes links 622(2) and 622(8) and BPD 312(4). BPD 312(0) identifies route 710(B) by determining, based on crumb route table 600, that BPD 312(4) can forward packets to BPD 312(6). Accordingly, BPD 312(0) transmits packet 700 to BPD 312(4), and BPD 312(4) then forwards packet 700 to BPD 312(6). BPD 312(0) may cache packet 700 to prepare for situations where packets need to be rerouted, thereby avoiding the need to re-transmit packets from the point of origin (CPD 302(0), in this example).

An advantage of this approach is that individual BPDs 312 can identify and respond to link failures without needing to request retransmission of packets from CPDs 302. Accordingly, network traffic can be reduced, thereby conserving power. BPDs may also propagate failure notifications upstream, as discussed below in conjunction with FIGS. 8A-8B.

Figure 8A:
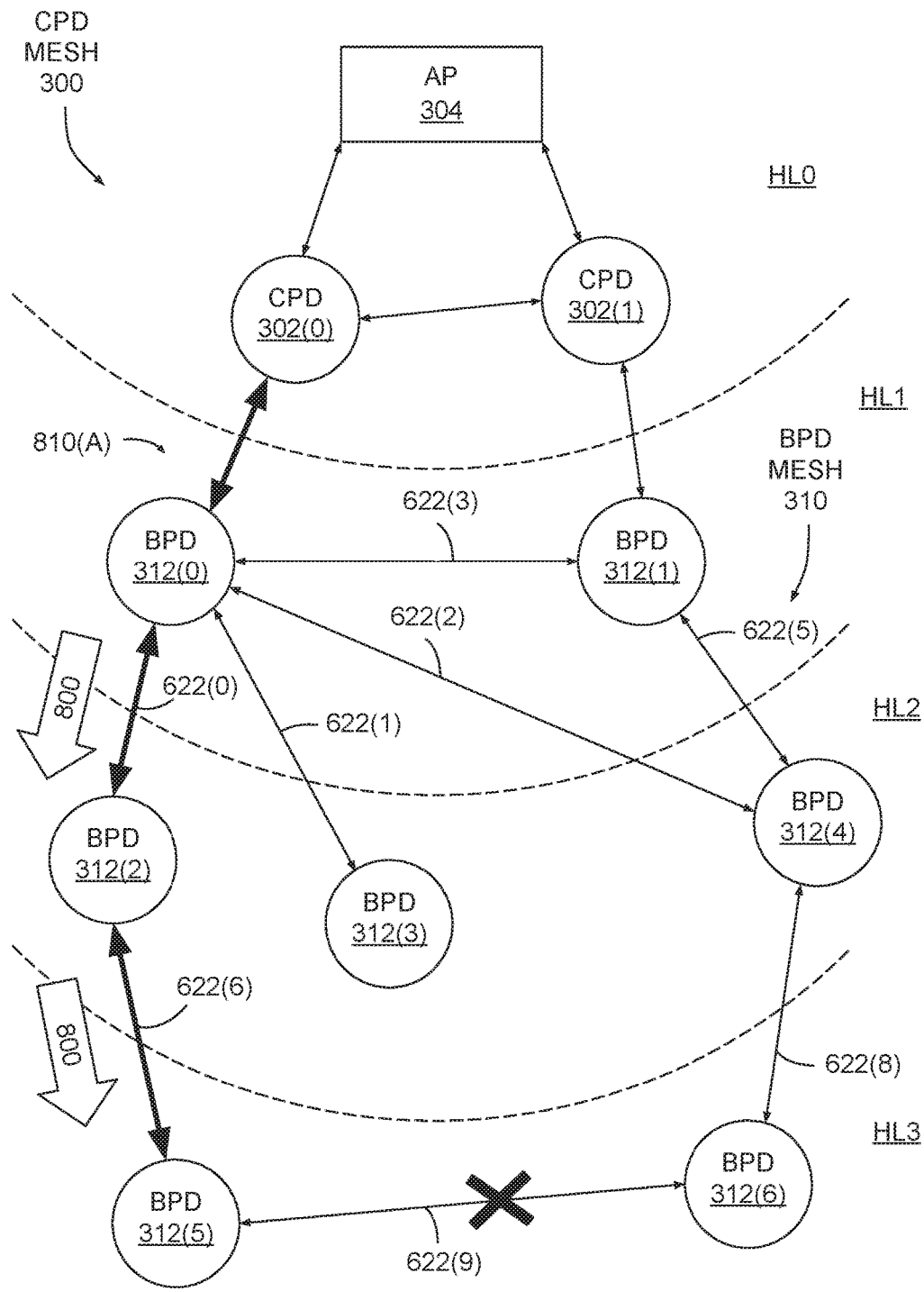
FIGS. 8A-8B illustrate how failure notifications propagate between layers of the wireless mesh network of FIG. 1, according to various embodiments of the present invention.
Figure 8B:
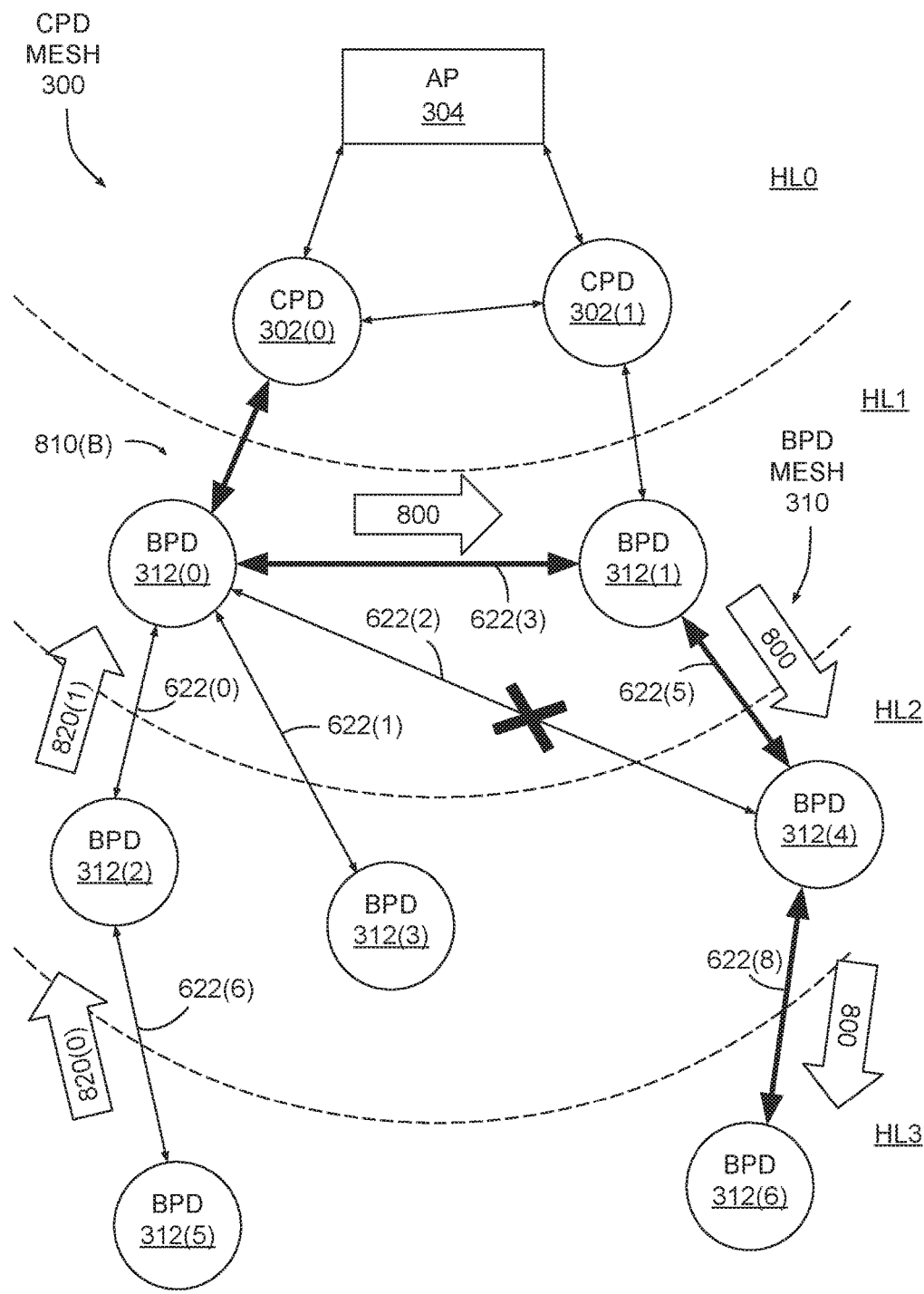

FIGS. 8A-8B illustrate how failure notifications propagate between layers of the wireless mesh network of FIG. 1, according to various embodiments of the present invention. As shown in FIG. 8A, BPD 312(0) transmits a packet 800 along a route 810(A) that includes links 622(0), 622(6), and 622(9) and BPDs 312(2) and 312(5). CPD 302(0) is the origin of packet 800, and BPD 312(6) is the destination for packet 800.

BPD 312(2) receives packet 800 and then forwards that packet to BPD 312(5). However, link 622(9) is inactive and so BPD 312(5) cannot forward packet 800 to BPD 312(6). In response to determining that link 622(9) is inactive, BPD 312(5) transmits a failure notification upstream to BPD 312(2), as discussed in greater detail below in conjunction with FIG. 8B.

As shown in FIG. 8B, BPD 312(5) transmits failure notification 820(0) upstream to BPD 312(2), indicating that BPD 312(5) is not able to forward packet 800 to BPD 312(6). In response to failure notification 820(0), BPD 312(2) may consult a crumb route table and identify any adjacent nodes (other than BPD 312(5)) capable of forwarding packet 800 to BPD 312(6). When doing so, BPD 312(2) may also increment a counter that tracks the number of packet failures associated with BPD 312(5). Because BPD 312(2) cannot forward packet 800 to any other adjacent nodes to reach BPD 312(6), BPD 312(2) transmits a failure notification 820(1) upstream to BPD 312(0).

Upon receipt of failure notification 820(1), BPD 312(0) consults crumb route table 600 in order to identify an alternate route to BPD 312(6). BPD 312(0) may determine that link 622(2) is inactive, thereby reducing the number of potential options for reaching BPD 312(6). However, BPD 312(0) may also determine that packets can be routed to BPD 312(6) via BPD 312(1). Accordingly, BPD 312(0) transmits packet 800 to BPD 312(1) via link 622(3). BPD 312(1) receives packet 800 and forwards the packet along link 622(5) to BPD 312(4). BPD 312(4) then forwards packet 800 to BPD 312(6). Packet 800 reaches the target destination despite multiple link failures and without requiring re-transmission from the point of origin, CPD 302(0). In one embodiment, BPD 312(0) may select between multiple alternate routes to reach BPD 312(6), if any exist, based on a link cost analysis such as that discussed above in conjunction with FIGS. 3A-5.

Referring generally to FIGS. 6A-8B, persons skilled in the art will understand that although the techniques described herein are discussed with respect to downlink transmissions, these techniques are equally applicable to uplink transmissions. In particular, crumb route table 600 may store routing information for transmitting packets in an inbound direction as well as in an outbound direction. The approach described herein is described as a series of steps below in conjunction with FIGS. 9A-9B.

Figure 9A:
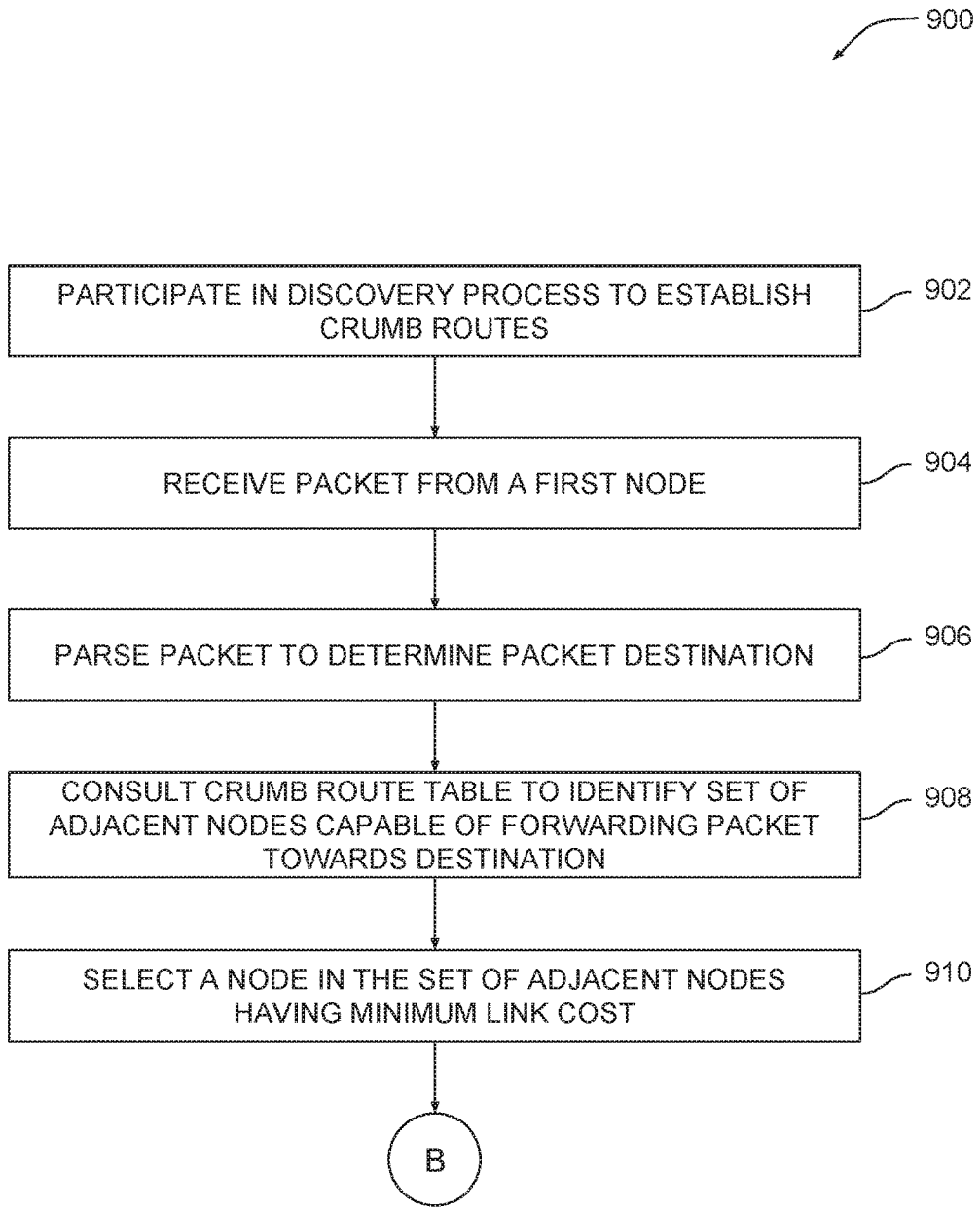
FIGS. 9A-9B set forth a flow diagram of method steps for rerouting a packet in response to a route failure, according to various embodiments of the present invention.
Figure 9B:
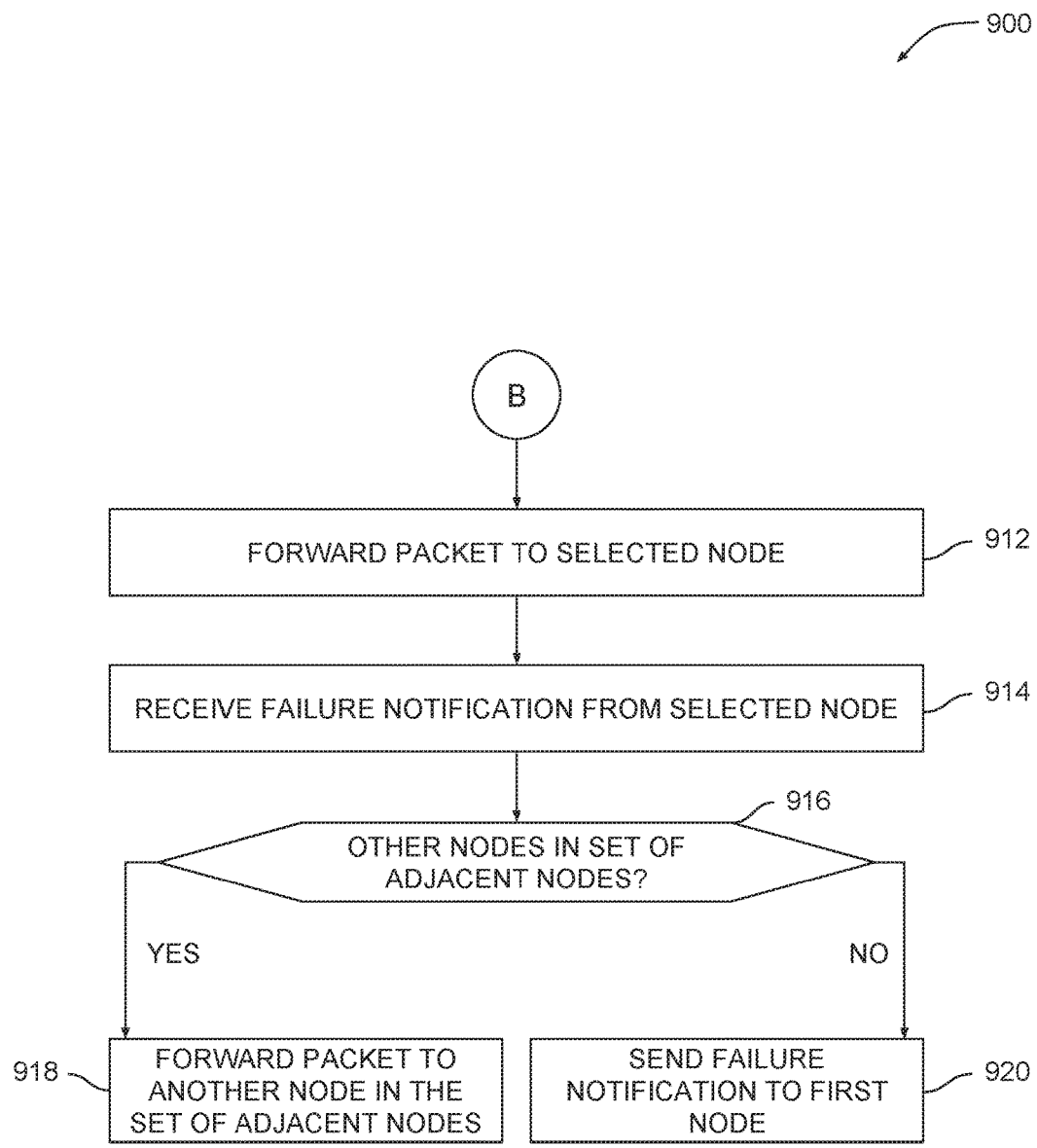

FIGS. 9A-9B set forth a flow diagram of method steps for rerouting a packet in response to a route failure, according to various embodiments of the present invention. Although the method steps are described in conjunction with the systems of FIGS. 1-4 and 6-8B, persons skilled in the art will understand that any system configured to perform the method steps, in any order, is within the scope of the present invention.

As shown in FIG. 9A, a method 900 begins at step 902, where a BPD 312 participates in a discovery process in order to establish a crumb route table. For example, during discovery the BPD 312 could identify the set of adjacent nodes (CPDs 302 and BPDs 312 alike) within wireless mesh network 102. The BPD 312 could share this adjacency information with other nodes in the network and acquire analogous adjacency information from other nodes. BPD 312 may then generate routes through wireless mesh network 102 that include hops between adjacent nodes. In this manner, BPD 312 could determine the particular set of adjacent nodes capable of forwarding packets to any other node in the network, and include this information in the crumb route table.

At step 904, the BPD 312 receives a packet from a first node. The first node could be an upstream CPD 302 or an upstream or downstream BPD 312. At step 906, the BPD 312 parses the packet to determine the packet destination. The packet destination could be a CPD 302 or BPD 312. At step 908, the BPD 312 consults the crumb route table generated at step 902 to determine the set of adjacent nodes capable of forwarding the packet towards the destination.

At step 910, the BPD 312 selects a node in the set of adjacent nodes with minimum link cost. The BPD 312 may implement the link cost metric discussed above in conjunction with FIGS. 3A-5. In situations where the set of adjacent nodes includes only one node, the BPD 312 need not perform the link cost analysis before selecting that one BPD. The method then proceeds in the manner discussed below in conjunction with FIG. 9B.

As shown in FIG. 9B, the method 900 continues at step 912, where the BPD 312 forwards the packet to the node selected previously at step 910. At step 914, the BPD 312 receives a failure notification from the selected node. In response to receiving the failure notification, at step 916, the BPD 312 determines whether the set of adjacent nodes includes any other nodes capable of reaching the target destination. If the set of adjacent nodes does, in fact, include additional nodes, the BPD 312 may then forward the packet (or a cached copy thereof) to one of those adjacent nodes. However, if the set of adjacent nodes includes no alternative options for reaching the packet destination, then, at step 920, the BPD 312 sends a failure notification to the first node. The BPD 312 may also update the crumb route table to indicate a number of failures associated with the selected node and/or mark the route through the selected node as inactive. In response to receiving a failure notification from the BPD 312, the first node may perform similar steps to either reroute the packet or transmit a failure notification to another node.

In sum, a battery-powered node within a wireless mesh network performs energy-aware packet routing based on multiple factors. The battery powered node computes, for a given link to an adjacent node, the energy needed to transmit a packet to the adjacent node. The battery-powered node also determines the amount of battery energy remaining in the adjacent node. Based on these two factors, the battery powered node computes a link cost associated with the link to the adjacent node. The battery-powered node performs a similar computation for all adjacent nodes and then forwards packets via these adjacent nodes based on the associated link costs. The battery-powered node also maintains a table of routes through adjacent nodes, and reroutes packets through different adjacent nodes in response to link failures.

At least one advantage of the techniques described herein is that BPDs within the wireless mesh network consume battery energy at similar rates, thereby avoiding situations where a single centrally located BPD depletes all battery energy and powers down prematurely. In addition, because the BPDs maintain multiple alternate routes through the network, each BPD is capable of responding to link failures without requiring the retransmission of packets from the point of origin.

1. Some embodiments of the invention include a computer-implemented method for routing packets across a mesh network, the method comprising: computing a first cost metric based on a first amount of energy associated with a first node and a second amount of energy associated with a second node, computing a second cost metric based on a third amount of energy associated with the first node and a fourth amount of energy associated with a third node, and based on the first cost metric and the second cost metric, selecting the second node for routing a first packet to a first destination along a first route.

2. The computer-implemented method of clause 1, wherein the first amount of energy associated with the first node comprises an amount of energy consumed when transmitting a packet from the first node to the second node via a first communication link.

3. The computer-implemented method of any of clauses 1 and 2, wherein the second amount of energy associated with the second node comprises an amount of energy remaining in a battery coupled to the second node.

4. The computer-implemented method of any of clauses 1, 2, and 3, wherein the third amount of energy associated with the first node comprises an amount of energy consumed when transmitting a packet from the first node to the third node via a second communication link.

5. The computer-implemented method of any of clauses 1, 2, 3, and 4, wherein the fourth amount of energy associated with the third node comprises an amount of energy remaining in a battery coupled to the third node.

6. The computer-implemented method of any of clauses 1, 2, 3, 4, and 5, wherein selecting the second node for routing the first packet comprises determining that the first cost metric is less than the second cost metric.

7. The computer-implemented method of any of clauses 1, 2, 3, 4, 5, and 6, further comprising: combining the first cost metric and the second cost metric to generate a total cost metric, computing a first proportion of traffic associated with the second node based on the second cost metric and the total cost metric, computing a second proportion of traffic associated with the third node based on the first cost metric and the total cost metric, distributing a first set of packets between the second node and the third node based on the first proportion of traffic and the second proportion of traffic.

8. The computer-implemented method of any of clauses 1, 2, 3, 4, 5, 6, and 7, wherein distributing the first set of packets between the second node and the third node comprises: identifying a first subset of packets included in the first set of packets based on the first proportion of traffic, identifying a second subset of packets included in the first set of packets based on the second proportion of traffic, transmitting the first subset of packets to the second node, and transmitting the second subset of packets to the third node.

9. The computer-implemented method of any of clauses 1, 2, 3, 4, 5, 6, 7, and 8 further comprising: combining the first cost metric with a first set of cost metrics associated with a first path through the second node to generate a first path cost, combining the second cost metric with a second set of cost metrics associated with a second path through the third node to generate a second path cost, wherein selecting the second node for routing the first packet to the first destination along the first route is based on the first path cost and the second path cost.

10. Some embodiments of the invention include a non-transitory computer-readable medium that, when executed by a processor, causes the processor to route packets across a mesh network by performing the steps of: computing a first cost metric based on a first amount of energy associated with a first node and a second amount of energy associated with a second node, computing a second cost metric based on a third amount of energy associated with the first node and a fourth amount of energy associated with a third node, and, based on the first cost metric and the second cost metric, selecting the second node for routing a first packet to a first destination along a first route.

11. The non-transitory computer-readable medium of clause 10, wherein the first amount of energy associated with the first node comprises an amount of energy consumed when transmitting a packet from the first node to the second node via a first communication link.

12. The non-transitory computer-readable medium of any of clauses 10 and 11, wherein the second amount of energy associated with the second node comprises an amount of energy remaining in a battery coupled to the second node.

13. The non-transitory computer-readable medium of any of clauses 10, 11, and 12, wherein the third amount of energy associated with the first node comprises an amount of energy consumed when transmitting a packet from the first node to the third node via a second communication link.

14. The non-transitory computer-readable medium of any of clauses 10, 11, 12, and 13, wherein the fourth amount of energy associated with the third node comprises an amount of energy remaining in a battery coupled to the third node.

15. The non-transitory computer-readable medium of any of clauses 10, 11, 12, 13, and 14, further comprising the steps of: computing a third cost metric based on a fifth amount of energy associated with the first node and a sixth amount of energy associated with a fourth node, and based on the third cost metric, determining that the fourth node should not be selected for routing the first packet to the first destination.

16. The non-transitory computer-readable medium of any of clauses 10, 11, 12, 13, 14, and 15, wherein determining that the fourth node should not be selected for routing the first packet to the first destination comprises determining that the third cost metric exceeds a first threshold.

17. The non-transitory computer-readable medium of any of clauses 10, 11, 12, 13, 14, 15, and 16, wherein the first cost metric and the second cost metric are less than the first threshold.

18. Some embodiments of the invention include a system for routing packets across a mesh network, comprising: a first downstream node coupled to a first destination node, a second downstream node coupled to the first destination node, a first node coupled to the first downstream node and the second downstream node and including: a memory storing an application, and a processor that executes the application to perform the steps of: computing a first cost metric based on a first amount of energy associated with the first node and a second amount of energy associated with the first downstream node, computing a second cost metric based on a third amount of energy associated with the first node and a fourth amount of energy associated with the second downstream node, and based on the first cost metric and the second cost metric, selecting the first downstream node for routing a first packet to the first destination node along a first route.

19. The system of clause 18, wherein the processor executes the application to perform the steps of computing the first cost metric, computing the second cost metric; and based on the first cost metric and the second cost metric, selecting the first downstream node.

20. The system of any of clauses 18 and 19, wherein the first amount of energy associated with the first node comprises an amount of energy consumed when transmitting a packet from the first node to the first downstream node via a first communication link, the second amount of energy associated with the first downstream node comprises an amount of energy remaining in a battery coupled to the first downstream node, the third amount of energy associated with the first node comprises an amount of energy consumed when transmitting a packet from the first node to the second downstream node via a second communication link, and the fourth amount of energy associated with the second downstream node comprises an amount of energy remaining in a battery coupled to the second downstream node.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for routing packets across a mesh network, the method comprising:
computing a first cost metric by multiplying a first amount of energy associated with a first node by a second amount of energy associated with a second node, wherein the first amount of energy associated with the first node comprises an amount of energy consumed when transmitting a packet from the first node to the second node via a first communication link, and the second amount of energy associated with the second node comprises an amount of energy remaining in a battery coupled to the second node;
computing a second cost metric based on a third amount of energy associated with the first node and a fourth amount of energy associated with a third node; and
based on the first cost metric and the second cost metric, selecting the second node for routing a first packet to a first destination along a first route.

2. The computer-implemented method of claim 1, wherein the third amount of energy associated with the first node comprises an amount of energy consumed when transmitting a packet from the first node to the third node via a second communication link.

3. The computer-implemented method of claim 1, wherein the fourth amount of energy associated with the third node comprises an amount of energy remaining in a battery coupled to the third node.

4. The computer-implemented method of claim 1, wherein selecting the second node for routing the first packet comprises determining that the first cost metric is less than the second cost metric.

5. The computer-implemented method of claim 1, further comprising:
combining the first cost metric and the second cost metric to generate a total cost metric;
computing a first proportion of traffic associated with the second node based on the second cost metric and the total cost metric;
computing a second proportion of traffic associated with the third node based on the first cost metric and the total cost metric;
distributing a first set of packets between the second node and the third node based on the first proportion of traffic and the second proportion of traffic.

6. The computer-implemented method of claim 5, wherein distributing the first set of packets between the second node and the third node comprises:
identifying a first subset of packets included in the first set of packets based on the first proportion of traffic;
identifying a second subset of packets included in the first set of packets based on the second proportion of traffic;
transmitting the first subset of packets to the second node; and
transmitting the second subset of packets to the third node.

7. The computer-implemented method of claim 1, further comprising:
combining the first cost metric with a first set of cost metrics associated with a first path through the second node to generate a first path cost;
combining the second cost metric with a second set of cost metrics associated with a second path through the third node to generate a second path cost;
wherein selecting the second node for routing the first packet to the first destination along the first route is based on the first path cost and the second path cost.

8. A non-transitory computer-readable medium that, when executed by a processor, causes the processor to route packets across a mesh network by performing the steps of:
computing a first cost metric by multiplying a first amount of energy associated with a first node by a second amount of energy associated with a second node, wherein the first amount of energy associated with the first node comprises an amount of energy consumed when transmitting a packet from the first node to the second node via a first communication link, and the second amount of energy associated with the second node comprises an amount of energy remaining in a battery coupled to the second node;
computing a second cost metric based on a third amount of energy associated with the first node and a fourth amount of energy associated with a third node; and
based on the first cost metric and the second cost metric, selecting the second node for routing a first packet to a first destination along a first route.

9. The non-transitory computer-readable medium of claim 8, wherein the third amount of energy associated with the first node comprises an amount of energy consumed when transmitting a packet from the first node to the third node via a second communication link.

10. The non-transitory computer-readable medium of claim 8, wherein the fourth amount of energy associated with the third node comprises an amount of energy remaining in a battery coupled to the third node.

11. The non-transitory computer-readable medium of claim 8, further comprising the steps of:
computing a third cost metric based on a fifth amount of energy associated with the first node and a sixth amount of energy associated with a fourth node; and
based on the third cost metric, determining that the fourth node should not be selected for routing the first packet to the first destination.

12. The non-transitory computer-readable medium of claim 11, wherein determining that the fourth node should not be selected for routing the first packet to the first destination comprises determining that the third cost metric exceeds a first threshold.

13. The non-transitory computer-readable medium of claim 12, wherein the first cost metric and the second cost metric are less than the first threshold.

14. A system for routing packets across a mesh network, comprising:
a first downstream node coupled to a first destination node,
a second downstream node coupled to the first destination node,
a first node coupled to the first downstream node and the second downstream node and including:
a memory storing an application, and
a processor that executes the application to perform the steps of:
computing a first cost metric by multiplying a first amount of energy associated with the first node a second amount of energy associated with the first downstream node, wherein the first amount of energy associated with the first node comprises an amount of energy consumed when transmitting a packet from the first node to the first downstream node via a first communication link, and the second amount of energy associated with the first downstream node comprises an amount of energy remaining in a battery coupled to the first downstream node, computing a second cost metric based on a third amount of energy associated with the first node and a fourth amount of energy associated with the second downstream node, and based on the first cost metric and the second cost metric, selecting the first downstream node for routing a first packet to the first destination node along a first route.

* * * * *